Aug. 6, 1940.   S. ITZIGSON   2,210,762
ANTIGLARE DEVICE
Filed Sept. 18, 1939
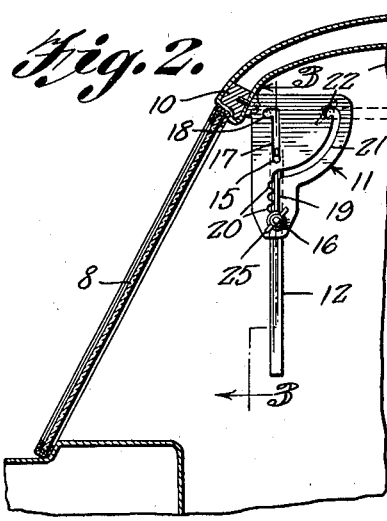
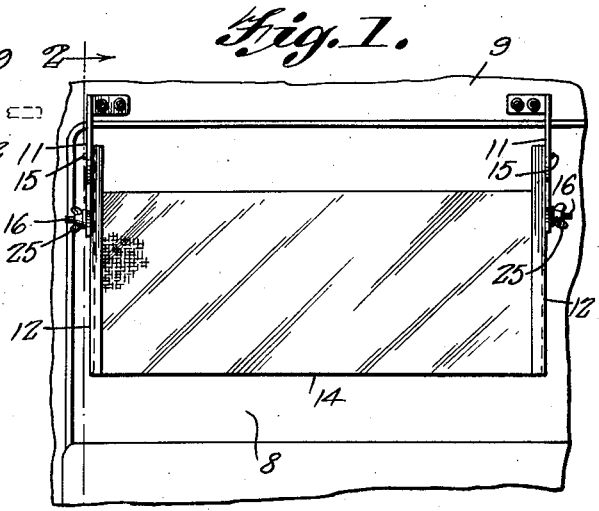
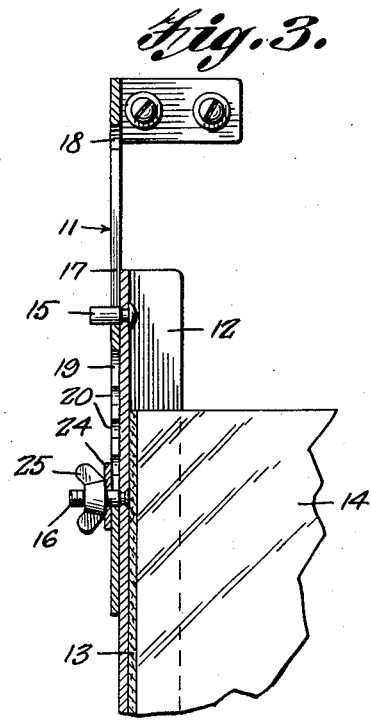
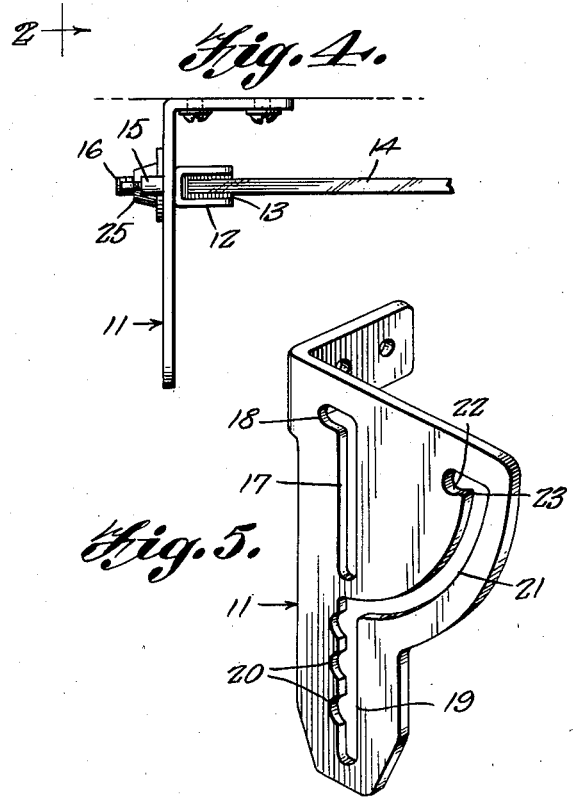
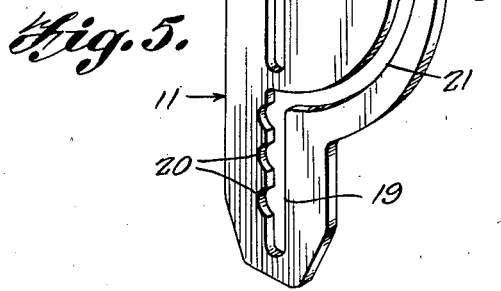
Samuel Itzigson, INVENTOR
BY Victor J. Evans & Co.
ATTORNEYS
WITNESS Patented Aug. 6, 1940

2,210,762

UNITED STATES PATENT OFFICE 2,210,762

ANTIGLARE DEVICE

Samuel Itzigson, Brooklyn, N. Y.

Application September 18, 1939, Serial No. 295,498

2 Claims. (Cl. 296—97)

My invention relates to antiglare devices and more particularly to antiglare devices used in connection with automobile windshields.

One of the principal objects of my invention is to provide an antiglare device attachable adjacent the windshield of an automobile and equipped with means for adjusting the antiglare material to positions below the line of vision.

Another object of my invention is to provide a device of the above described character wherein the device is capable of being adjusted to a fixed position when not in use and above the line of vision.

An important object of my invention is to provide a device of the above described character which is simple in construction, durable in use, efficient in operation and economical in manufacture.

Other objects and advantages will be apparent from the following description, appended claims and annexed drawing.

Referring to the drawing wherein like reference characters designate like parts throughout the several views:

Figure 1 is a rear elevation illustrating a section of a windshield having my invention secured adjacent thereto.

Figure 2 is a sectional view taken on the line 2—2 of Figure 1.

Figure 3 is a sectional view taken on the line 3—3 of Figure 2.

Figure 4 is a top plan view of one end of my invention.

Figure 5 is a detail perspective view of one of the brackets.

In practicing my invention, as illustrated in the drawing, I employ a windshield 8 forming a part of a motor vehicle body 9 of ordinary construction and which is equipped with the usual upper window rail 10 adjacent the windshield. Secured to the rail 10 are the upper angled ends of a pair of spaced brackets 11 for supporting therebetween a spaced pair of channel arms 12 receiving therein U-shaped members 13 fixed on the ends of a panel of antiglare material 14, the latter being preferably constructed of amber glass or the like.

The upper ends of the arms 12 are provided with laterally and outwardly extending trunnions 15 fixed thereto and between the upper and lower ends with outwardly extending bolts 16 also fixed thereto. The trunnions 15 are slidably operable within aligned vertically disposed slots 17 formed in the upper end sections of the brackets 11. The upper ends of the slots 17 are fashioned with horizontally disposed seats 18 extending toward the windshield 8 and receiving therein the trunnions 15 as hereinafter more fully set forth. Subjacent the slots 17, the brackets are fashioned with aligned vertically disposed slots 19, each having an invected wall adjacent the windshield and defining a plurality of laterally disposed adjusting seats 20 for selectively receiving therein the bolts 16 as hereinafter set forth.

Spaced from the slots 17 and rearwardly with respect to the windshield, the brackets are fashioned with arcuate slots 21 having lower ends communicating with the upper ends of the slots 19. The upper ends of the slots 21 terminate in forwardly and horizontally disposed arcuate-shaped seats 22, the latter being of a greater vertical width than the ends of the slots 21 and with the lower and front slots of the seats 22 and slots 21, at their jointures, defining a slightly upwardly extending rounded projection 23 disposed within the paths of the bolts 16 when seated within the seats 22 as clearly illustrated in Figure 2 of the drawing.

In use, when the panel 14 is disposed in a horizontal position with respect to the windshield and out of the line of vision of the driver, the trunnions 15 and bolts 16 are disposed within the seats 18 and 22 respectively. The bolts 16 are provided adjacent their outer ends with washers 24 and on the outer ends with wing nuts 25 whereby the arms 12 are clamped to the brackets 11. When it is desired to lower the panel 14 within the line of vision, the wing nuts 25 sufficiently loose on the bolts 16 and the panel move rearwardly to dispose the trunnions 15 against the upper ends of the rear walls of the slots 17 whereupon the panel is pivoted downwardly with the bolts 16 operating within the slots 21. In this position, the trunnions and bolts are moved downwardly within the slots 17 and 19 respectively a sufficient distance according to the desires of the user and the bolts 16 selectively seated within an aligned pair of the seats 20 thereby disposing the panel 14 in a vertical position and within the line of vision. When the panel is thus disposed, the wing nuts 20 are operated to clamp the arms 12 against the inner faces of the brackets 11. A reverse operation serves to effect raising of the panel to a horizontal position. Obviously by selectively positioning the bolts 16 in the seats 20, the panel may be adjusted in a vertical plane.

It is also obvious that the invention is not confined to the herein described use therefor as it may be utilized for any purpose to which it is adaptable. It is therefore to be distinctly understood that the invention is not limited to the specific construction as illustrated and described, as the same is only illustrative of the principles of operation, which are capable of extended application in advance forms, and that the invention comprehends all construction within the scope of the appended claims.

What is claimed is:

1. A device of the character described, comprising, in combination, a windshield, a window rail adjacent said windshield, a pair of brackets secured to said rail and depending therefrom, said brackets formed with pairs of upper and lower vertically aligned slots and with horizontally disposed seats communicating with said upper slots at the upper ends of the latter, said brackets formed with aligned arcuate slots communicating with said lower slots at the upper ends of the latter and with horizontally disposed seats communicating with said arcuate slots at the upper ends of the latter, a panel of antiglare material arranged between said brackets, arms fixed to the sides of said panel and provided with trunnions operable within said upper slots and with pins operable within the other slots, and means carried by said pins for clamping said arms and panel to said brackets in a horizontal position when said trunnions and said pins are disposed in said first and second mentioned seats respectively and said arms and panel in a vertical position when said trunnions and said pins are disposed in said upper and lower slots respectively.

2. A device of the character described, comprising, in combination, a windshield, a window rail adjacent said windshield, a pair of brackets secured to said rail and depending therefrom, said brackets formed with pairs of upper and lower vertically aligned slots and with horizontally disposed seats communicating with said upper slots at the upper ends of the latter, said brackets formed with aligned arcuate slots communicating with said lower slots at the upper ends of the latter and with horizontally disposed seats communicating with said arcuate slots at the upper ends of the latter, a panel of antiglare material arranged between said brackets, arms fixed to the sides of said panel and provided with trunnions operable within said upper slots and with pins operable within the other slots, and means carried by said pins for clamping said arms and panel to said brackets in a horizontal position when said trunnions and said pins are disposed in said first and second mentioned seats respectively and said arms and panel in a vertical position when said trunnions and said pins are disposed in said upper and lower slots, each of said brackets having an invected wall defining said lower slots and constituting a plurality of seats for selectively receiving the respective pins for effecting a vertical adjustment of said panel with respect to said brackets.

SAMUEL ITZIGSON.